United States Patent
Chuang et al.

(10) Patent No.: US 7,099,413 B2
(45) Date of Patent: *Aug. 29, 2006

(54) METHOD FOR NEAR OPTIMAL JOINT CHANNEL ESTIMATION AND DATA DETECTION FOR COFDM SYSTEMS

(75) Inventors: Justin C. Chuang, Holmdel, NJ (US); Ye Li, Marietta, GA (US); Lang Lin, Piscataway, NJ (US)

(73) Assignee: AT&T Corp., New York, NY (US)

( * ) Notice: Subject to any disclaimer, the term of this patent is extended or adjusted under 35 U.S.C. 154(b) by 824 days.

This patent is subject to a terminal disclaimer.

(21) Appl. No.: 09/774,875

(22) Filed: Feb. 1, 2001

(65) Prior Publication Data

US 2002/0054632 A1 May 9, 2002

Related U.S. Application Data

(60) Provisional application No. 60/241,195, filed on Oct. 17, 2000, provisional application No. 60/180,799, filed on Feb. 7, 2000.

(51) Int. Cl.
H04B 7/08 (2006.01)
(52) U.S. Cl. ............... 375/347; 375/260; 375/262; 375/341; 370/210
(58) Field of Classification Search ............. 375/262, 375/265, 340, 341, 346, 347, 144, 148, 260, 375/267; 370/210; 714/794, 795, 796
See application file for complete search history.

(56) References Cited

U.S. PATENT DOCUMENTS

| | | | | |
|---|---|---|---|---|
| 5,434,623 A | * | 7/1995 | Coleman et al. | 375/240.04 |
| 5,867,532 A | * | 2/1999 | Ito et al. | 375/265 |
| 5,973,642 A | * | 10/1999 | Li et al. | 342/378 |
| 6,243,423 B1 | * | 6/2001 | Sakoda et al. | 375/262 |
| 6,327,314 B1 | * | 12/2001 | Cimini et al. | 375/340 |
| 6,339,612 B1 | * | 1/2002 | Stewart et al. | 375/140 |
| 6,459,728 B1 | * | 10/2002 | Bar-David et al. | 375/231 |
| 6,477,210 B1 | * | 11/2002 | Chuang et al. | 375/340 |
| 6,480,554 B1 | * | 11/2002 | Toskala et al. | 375/340 |
| 6,654,429 B1 | * | 11/2003 | Li | 375/316 |
| 6,671,338 B1 | * | 12/2003 | Gamal et al. | 375/346 |
| 2002/0159543 A1 | * | 10/2002 | Perlow et al. | |

OTHER PUBLICATIONS

J. Bingham, "Multicarrier Modulation for Data Transmission: An Idea Whose Time Has Come," IEEE Communications Magazine, May 1990, pp. 5-14.

L. Cimini, "Analysis and Simulation of a Digital Mobile Channel Using Orthogonal Frequency Division Multiplexing," IEEE Transactions on Communications, vol. Com-33, No. 7, Jul. 1985, pp. 665-675.

(Continued)

Primary Examiner—Young T. Tse

(57) ABSTRACT

Joint channel estimation and maximum likelihood decoding method for Coded Orthogonal Frequency Division Multiplexing (COFDM) systems are presented. Using this method in conjunction with convolutional coding, robust and nearly optimal coherent detection can be achieved in rapid dispersive fading channels. Significant performance gain in packet data throughput is realized in a system with aggressive frequency reuse. A method for estimating channel characteristics in a multicarrier transmission system comprising the steps of receiving a multicarrier signal, applying Fast Fourier transformations to the multicarrier signal, estimating channel characteristics of a multicarrier channel over which the multicarrier signal was transmitted using a combination of iterative forward processing and iterative backward processing, and decoding the transformed multicarrier signal is presented.

8 Claims, 16 Drawing Sheets

OTHER PUBLICATIONS

W. Zou et al., "COFDM: An Overview," IEEE Transactions on Broadcasting, vol. 41, No. 1, Mar. 1995, pp. 1-8.

J. Chuang, "The Effects of Time Delay Spread on Portable Radio Communications Channels with Digital Modulation," IEEE Journal on Selected Areas in Communications, vol. SAC-5, No. 5, Jun. 1987, pp. 879-889.

Y. Li et al., "Robust Channel Estimation for OFDM Systems with Rapid Dispersive Fading Channels," IEEE Transactions on Communications, vol. 46, No. 7, Jul. 1998, 902-915.

J. Chuang, et al., "Spectrum Resource Allocation for Wireless Packet Access with Application to Advanced Cellular Internet Service," IEEE Journal on Selected Areas in Communications, vol. 16, No. 6, Aug. 1998, pp. 820-829.

L. Cimini, et al., "Advanced Cellular Internet Service (ACIS)," IEEE Communications Magazine, Oct. 1998, pp. 150-159.

N. Seshadri, "Joint Data and Channel Estimation Using Blind Trellis Search Techniques," IEEE Transactions on Communications, vol. 42, No. 2/3/4, Feb./Mar./Apr. 1994, pp. 1000-1011.

V. Tarokh, et al., "Space-Time Codes for High Data Rate Wireless Communication: Performance Criterion and Code Construction," IEEE Transactions on Information Theory, vol. 44, No. 2, Mar. 1998, pp. 744-765.

G. Ungerboeck, "Channel Coding with Multilevel/Phase Signals," IEEE Transactions on Information Theory, vol. IT-28, No. 1, Jan. 1982, pp. 55-67.

* cited by examiner

METHOD FOR NEAR OPTIMAL JOINT CHANNEL ESTIMATION AND DATA DETECTION FOR COFDM SYSTEMS

RELATED APPLICATIONS

This application claims the benefit of priority of Provisional Application No. 60/241,195, filed on Oct. 17, 2000, and of Provisional Application No. 60/180,799, filed on Feb. 7, 2000, and is related by subject matter to U.S. Pat. No. 6,477,210, entitled "System for Near Optimal Joint Channel Estimation and Data Detection for COFDM Systems," by the inventors of the present application filed concurrently herewith.

FIELD OF INVENTION

The invention relates generally to communications and particularly to a method and apparatus for near optimal joint channel estimation and data detection to improve channel tracking and, thus, improve link robustness.

BACKGROUND OF THE INVENTION

The rapid growth in the use of the Internet and the increasing interest in portable computing devices have triggered the desire for high-speed wireless data services. One of the more promising candidates for achieving high data rate transmission in a mobile environment is Orthogonal Frequency Division Multiplexing (OFDM), which divides the wide signal bandwidth into many narrow-band subchannels, which are transmitted in parallel. Each subchannel is typically chosen narrow enough to eliminate the effects of delay spread. Coded OFDM (COFDM) systems, which combine both OFDM and channel coding techniques, are able to improve the performance further by taking advantage of frequency diversity of the channel.

Though both differential and coherent demodulation can be applied in a COFDM system, the latter leads to a performance gain of 3 to 4 dB in signal-to-noise ratio (SNR) with accurate channel estimation. Channel estimation techniques realized by a frequency-domain filter using Fast Fourier Transform (FFT), followed by time-domain filters for a COFDM system with Reed-Solomon (RS) coding have been proposed. These channel estimation techniques, while good, did not provide the near optimal channel estimation required for data-decoding with improved channel tracking capability for reliable link performance even under high user mobility and/or high RF carrier frequency.

The physical layer configuration of the system for near optimal joint channel estimation and data detection for COFDM systems is depicted in FIG. 1A. An exemplary transmitter 105 is shown on top and an exemplary receiver 140 is shown on the bottom of FIG. 1A. At transmitter 105, a data stream is accepted by a convolutional encoder 110, which convolutionally encodes the data stream. The encoded data stream may then optionally be forwarded to an interleaver 115 for interleaving. If the encoded data stream is interleaved in the transmitter 105 then the receiver 140 must correspondingly de-interleave the encoded data stream. After interleaving, a modulator 120, for example a QPSK modulator 120, modulates the encoded (and optionally interleaved) data stream, which is then forwarded to an inverse Fast Fourier transformer 125, to subject the modulated encoded (and optionally interleaved) data stream to inverse Fast Fourier transformation. The transformed modulated (and optionally interleaved) encoded data stream (signal) is then transmitted, in the present invention, over the air via RF unit 130 and antenna 135.

Correspondingly, receiver 140 accepts multicarrier transmitted signals (data streams) via antennas 145 and RF units 150 and subjects the received multicarrier signals to Fast Fourier transformation using Fast Fourier transformers 155. These transformed signals are concurrently fed into channel estimator 165 and demodulators 160, for example QPSK demodulators. The demodulated transformed signals are combined in maximum ratio combiner 170. The combined demodulated transformed are then optionally de-interleaved using de-interleaver 175. The combined demodulated transformed (and optionally de-interleaved) signal is then decoded using Viterbi decoder 180. The decoded combined demodulated transformed (and optionally de-interleaved) signal is then fed back into channel estimator 165, which forwards channel estimations, which are added to the transformed signals that are forwarded to demodulators 160.

FIG. 1B shows the baseband processing, in particular, the iterative nature of the receiver portion of the system disclosed herein for near optimal joint channel estimation and data detection for COFDM systems. Channel estimator 165 accepts transformed signal 190. Channel estimations 194 are fed back into channel estimator 165. Channel estimations 195 are fed into decoder 185, which comprises maximum ratio combiner 170 (shown in FIG. 1A), optional de-interleaver 175 (shown in FIG. 1A) and Viterbi decoder 180 (shown in FIG. 1A). Channel estimations 195 are fed into decoder 185 via demodulator 160 (shown in FIG. 1A, but not shown in FIG. 1B for clarity and to highlight the iterative nature of the system), which demodulates the transformed signal using channel characteristics. Decoder 185 also accepts transformed signal 190. Decoder 185 outputs signal 192, which is fed back into channel estimator 165.

An OFDM signal is divided into a number of subchannels. By way of example, an OFDM signal bandwidth is divided into 120 6.25-kHz subchannels with QPSK modulation on each subchannel. At the receiver, the demodulated signals from two receiving branches are combined using maximal ratio combining and then decoded. With a symbol period of 200 μs (including a 40-μs guard interval) and 1/2-rate coding, a maximum information rate of 600 kbps can be achieved in a 750-kHz bandwidth (about 800 kHz including guard bands). The information rate is calculated by dividing the 120 subchannels (tones) by the 200 μs period to obtain 600 kbps.

For purposes of example for the present invention, 1/2-rate convolutional codes (CC) are considered. The results with 1/2-rate Reed-Solomon (RS) code based on Galois-Field (64) (GF(64)) are compared. The size of a code word is the same as that of an OFDM block (an OFDM symbol of 200 μs and 120 subchannels). To achieve coding gain with inherent frequency diversity in OFDM, a simple interleaving scheme is applied. For both RS and CC cases, the first 120 bits of a code word are assigned to the in-phase component and the rest to the quadrature component. To gain additional randomness within a code word for the CC case, each 120-bit group is interleaved over subchannels by an 11-by-11 block interleaver (without the last bit).

In the simulations, the wireless channel, as a Rayleigh-fading channel, with a two-ray multipath delay profile is modeled. Good performance for impulse separation as high as 40-μs can be achieved; a 5-μs impulse separation in the numerical results is considered.

For the performance with respect to channel variations, maximum Doppler frequency up to 200 Hz, which is reasonable for most vehicular speeds, for a possible RF carrier frequency around 2 GHz is considered. To demonstrate the advantage of the proposed joint detection methods, results at a maximum Doppler frequency as high as 500 Hz corresponding to a scenario in which the wireless system uses a higher carrier frequency, e.g. 5 GHz are presented.

In the medium access control (MAC) layer, a frequency reuse is considered with dynamic resource management, e.g., Dynamic Packet Assignment (DPA), to achieve high spectral efficiency for packet data access.

A simple analysis to highlight the ideal or optimal joint channel estimation and maximum likelihood (ML) decoding scheme indicated in FIG. 1A for the case of M=2 receiving antennas is now presented.

At a diversity receiver, the signal from the m th antenna at the k th subchannel and the n th block can be expressed as $$x_{m,n,k} = h_{m,n,k} a_{n,k} + w_{m,n,k} \quad (1)$$

where $a_{n,k}$, $h_{m,n,k}$ and $w_{m,n,k}$ are the transmit signal, channel response and additive Gaussian noise, respectively.

For convolutional codes, because the size of a code word is the same as that of the OFDM block, (1) can be rewritten as $$x_{m,n} = H_{m,n} c_n + w_{m,n}, \quad (2)$$

where, if there are $K_f$ subchannels, $H_{m,n} = \text{diag}(h_{m,n,1}, h_{m,n,2}, \ldots, h_{m,n,K_f})$, $c_n$ is the transmitted code word at time epoch n, and the rest of the vectors are similarly defined.

Assume that the number of code words is N, we introduce the following notations, $$c = [c_1^T, c_2^T, \ldots, c_N^T]^T,$$

$$H_m = \text{diag}(H_{m,1}, H_{m,2}, H_{m,N}),$$

$$x_m = [x_{m,1}^T, x_{m,2}^T, \ldots x_{m,N}^T]^T. \quad (3)$$

At the receiver, the objective is to solve a maximum likelihood (ML) problem $$\hat{c} = \arg \min_c \left[ \min_{H_m} \sum_m \|x_m - H_m c\|^2 \right], \quad (4)$$

with a constraint on channel response $$L(H_m) = 0, \quad (5)$$

where L( ) is a constraint function. In a wireless environment, this constraint can be simplified to be $$\sum_{l=-K_m}^{K_m} B_{n,l} d(H_{m,n-l}) = 0, \quad (6)$$

where the length of the channel memory is $K_m$ OFDM symbol durations, $B_{n,l}$ are coefficients determined by the correlation between channel responses at the time epochs n and n−1, which is a function of the Doppler spectrum of the channel, and d( ) is a vector function defined by $d(H_{m,n}) = [h_{m,n,1}, h_{m,n,2}, \ldots, h_{m,n,K_f}]^T$.

The optimal solution of this ML problem can be obtained by exhaustive search. It requires solving the mean square error (MSE)

$$MSE(c) = \min_{H_m} \sum_m \|x_m - H_m c\|^2, \quad (7)$$

for any possible c with the channel constraint (6). Then, $$c = \arg \min_c MSE(c). \quad (8)$$

After obtaining MSE(c), the corresponding channel estimate $H_m$ (c) can be found. Consequently, the optimal approach for estimating channel response requires the knowledge of the entire set of x and c.

Another observation from this ML receiver is that the channel estimation results $H_m$ is not a direct output of the detection process and hence, channel estimation which calculates $H_m$ explicitly may not be necessary in theory. However, for other required parameter estimation, such as timing and frequency synchronization, a known data sequence is usually transmitted in the beginning of a group of OFDM blocks. This known data sequence, also called a synch word or a unique word, can be used as a training sequence in (7) to obtain initial channel estimate explicitly without resorting to blind detection. This initial channel characteristic is helpful for solving this ML problem with better numerical stability and tracking property. This initial channel estimation can be easily solved in the frequency domain by first taking FFT as shown in FIG. 1A.

One related method and system is U.S. Pat. No. 6,327,314, METHOD AND APPARATUS FOR CHANNEL ESTIMATION FOR MULTICARRIER SYSTEMS, which was filed Jun. 3, 1998, and is commonly held and incorporated herein by reference. The near optimal joint channel estimation and data detection method and system of the present invention was born from the research that resulted in that application and the subsequent determination that improvements could be made in the channel estimation.

The sub-optimal approach of the related system and method is now outlined. Because of the formidable complexity of the optimal ML receiver, some sub-optimal solutions are widely used in practice. The related sub-optimal solution is to divide the ML problem into two parts, channel estimation and coherent decoding. Then, the problem can be solved by iteratively estimating channel and decoding in the forward direction (in time).

At a time instant n, given a channel estimate $\hat{H}_{m,n}$, initially obtained by using training sequence (in the frequency domain dividing the transfer function of the received signal by the transfer function of the known data), the maximum likelihood (ML) problem $$\hat{c}_n = \arg \min_{c_n} \sum_m \left\| x_{m,n} - \hat{H}_{m,n} c_n \right\|^2 \quad (9)$$

can be solved. Then, the reference for channel estimation is $$\tilde{H}_{m,n} = \arg \min_{H_{m,n}} \sum_m \|x_{m,n} - H_{m,n} \hat{c}_n\|^2. \quad (10)$$

Finally, the estimate for the time instant n+1 is obtained by solving a linear constrained equation (6). Considering a stationary channel with fixed maximum Doppler frequency, the coefficients $B_{n,l}$ are independent of n, and can be written as $B_l$, which are used as the coefficients in the FIR filter to track channel variations. Consequently, a simplification of (6) with only previous references for prediction-type estimation leads to $$\sum_{l=1}^{M_L} B_l d(\tilde{H}_{m,n+1-l}) - d(\hat{H}_{m,n+1}) = 0, \quad (11)$$

where $M_l$ is the number of taps of an FIR filter and $B_l$ are preset coefficients designed to achieve the minimum mean square error (MMSE) of estimation. This MMSE estimator can be realized by a frequency-domain filter using the Fast Fourier Transform (FFT), followed by an $M_l$-tap time-domain filter, $$B_f = b_l F^{-1} B_f F, \quad (12)$$

where $b_l$ is the time-domain filter coefficient, F is the FFT matrix, $B_f$ is a diagonal matrix, and $F^{-1} B_f F$ is the frequency-domain filter.

The MMSE filter coefficients $b_l$ and $B_f$ were derived assuming $\hat{c}_n = c_n$ for a given set of Doppler frequency and delay spread. It is shown that this estimator is robust regardless of frequency or time mismatches. With a low Doppler frequency, it has been shown, that a 5-tap ($M_l$=5) estimator can successfully predict the channel.

To obtain accurate initial channel estimation, a training OFDM block is sent at the beginning of a transmission, in which $c_l$ is known to obtain $\tilde{H}_{m,l}$. The channel parameters for the new time epochs and the unknown code words can be successively solved in the forward direction (time advance).

The assumption $\hat{c}_n = c_n$ cannot be always guaranteed; an incorrectly detected code word introduces wrong channel estimation and hence, can cause a wrong detection of the successive code words. This error propagation is the dominant impairment of the link performance at high SNR. In order to alleviate the problem of error propagation, a training OFDM block is inserted every $N_t$ block. In the simulations presented herein, $N_t$=10 is considered.

In FIG. 2, the performance of the coherent reception with RS code and convolutional codes for 40-Hz maximum Doppler frequency is shown. The convolutional codes are shown with different constraint length (K) ranging from 3 to 9 as dashed lines. The performance of convolutional codes is substantially better than that of the RS code, which is shown as a solid line with cross lines. In order to achieve a Word Error Rate (WER) of $10^{-2}$, the K=9 CC needs 4 dB lower SNR than the RS code. In the use of WER in the present invention, it is assumed that a word is a codeword. Moreover, the performance of the K=9 CC with channel estimation is very close to the one with the ideal channel information shown as a solid line.

In FIG. 3, the performance at 200-Hz Doppler is shown. In comparison with the RS code, the CC's are still superior although the degradation with respect to the idealized case is higher due to poorer channel tracking. In fact, an error floor at the high SNR region exists due to tracking errors. Once again the RS coded signal is indicated as a solid line with cross lines. The convolutionally coded signals are indicated by dashed lines and ideal channel information is indicated by a solid line.

In FIG. 4, the performance of the K=9 CC with different maximum Doppler frequencies is shown. With a low Doppler frequency, a 5-tap ($M_l$=5) estimator used here can successfully predict the channel and the performance is very close to that with idealized channel estimation. However, when the fading is relatively fast, it is difficult to estimate the channel correctly and the WER floors on the order of $10^{-3}$ can be clearly observed for at a maximum Doppler frequency of 200 Hz. That is, it was found that the original method works well in slow fading but degrades significantly in fast fading. Once again the ideal Doppler frequency is indicated by a solid line. A Doppler frequency of 200 Hz is indicated by a dashed line. A Doppler frequency of 175 Hz is indicated by a dashed line with small circles. A Doppler frequency of 150 Hz is indicated by a dashed line with triangles and a Doppler frequency of 125 Hz is indicated by a dashed line with cross lines.

FIG. 1B depicts a block diagram for a baseband receiver. It is simplified to the extent that only channel estimator and decoder portions of the receiver are depicted. The decoder further comprises a plurality of demodulators, as well as a maximum ratio combiner, an optional deinterleaver (to match an optional interleaver in the transmitter) and a Viterbi decoder, all depicted in FIG. 1A. However, FIG. 1B depicts the structure and corresponding connections of the receiver depicted in FIG. 1A. Note, all x, ĉ, Ĥ, H̃ are complex. Although it may seem strange to have a complex codeword, ĉ, it is very natural to treat coding and modulation as a whole like spatial-temporal coding as discussed in "Space-time codes for high data rate wireless communication: performance criterion and code construction", by V. Tarokh, N. Seshadri, and A. Calderbank, published in *IEEE Trans. Info. Theory*, vol. 44, no. 2, pp. 744–765, March 1998 or coded modulation "Channel coding with multilevel/phase signals," by G. Ungerboeck, published in *IEEE Trans. Info. Theory*, vol. IT-28, no. 1, pp. 55–67, January 1982.

At a time instant n, the channel estimator unit has two tasks. One is to produce the channel estimates of current time instant, $\hat{H}_{1,n}, \hat{H}_{2,n}, \ldots$ with its input $x_{1,n}, x_{2,n}, \ldots$ and feedback $\tilde{H}_{1,n-M_l}, \tilde{H}_{2,n-M_l}, \ldots, \tilde{H}_{l,n-1}, \tilde{H}_{2,n-1}, \ldots$ by equation (11). The other task is to produce references $\tilde{H}_{1,n}, \tilde{H}_{2,n}, \ldots$ for estimate processing in the next time instant by equation (10) when $\hat{c}_n$ is available. At a time instant n, when $\hat{H}_{1,n}, \hat{H}_{2,n}, \ldots$ are available, the decoder unit produces decoded information $\hat{c}_n$ by (9).

The flowchart of this method is shown in FIG. 1C. The related channel estimation method is first initialized at step 165-1. Transmitted signals are received at step 165-2. A determination is then made at step 165-3 as to whether the received block is a training block. If the received block is a training block then $\hat{c}_n$ is known and $$\tilde{H}_{m,n} = \arg\min_{H_{m,n}} \sum_m \|x_{m,n} - H_{m,n}\hat{c}_n\|^2$$

is calculated at step 165-5. This is a reference for the channel estimation $$\sum_{l=1}^{M_L} B_l d(\tilde{H}_{m,n+1-l}) - d(\hat{H}_{m,n+1}) = 0$$

which is calculated next at step 165-6. The block number is incremented at step 165-7 and a determination is made if the end of the frame has been reached at step 165-8. If the current block is not a training block then $\hat{c}_n$ is decoded at step 165-4

$$\hat{c}_n = \arg\min_{c_n} \sum_m \|x_{m,n} - \hat{H}_{m,n} c_n\|^2$$

is calculated before calculating the reference and channel estimation.

It should be clear from the foregoing that there is room for improvement between the prior art and optimal joint channel estimation and data detection. An object, therefore, of the present invention is to improve the joint channel estimation. This will have the effect of reducing the impact of noise as well as reducing decoding errors. Thus, overall system performance will be improved.

It is a further object of the present invention to provide a method and system that are robust even in light of a mismatch between Finite Impulse Response (FIR) coefficients and the true channel.

Another object of the present invention is to provide a method and system with improved channel tracking capability, resulting in reliable link performance even under high user mobility and/or high RF carrier frequency. With improved link performance, data rates significantly higher than currently available (or even than third generation systems in planning) can be offered to subscribers.

All of the above objects can be achieved nearly optimally even in rapid dispersive fading channels.

SUMMARY OF THE INVENTION

An advance in the art is achieved by realizing that an iterative approach for developing a channel estimation which employs current information, e.g. decoded data and newly received signal, yields a better channel estimation. At each time epoch n, the improved receiver does not proceed to the time epoch n+1 immediately. Instead, the receiver uses the newly generated channel information for the next time epoch, n+1, which is derived based on the current information, to substitute for the current channel estimate and repeats the calculation for the current channel estimation and the decoding of the transmitted symbols. In other words, the same procedures are performed twice. Thus, an OFDM receiver of the present invention estimates the channel by receiving a multicarrier signal, transforming the received signals by applying Fast Fourier transformations, and estimates the channel characteristics of the multicarrier channel using iterative processing, and in the process also decoding the transform multicarrier signal.

DETAILED DESCRIPTION OF THE PREFERRED EMBODIMENTS

A method and system using two channel estimation schemes, which improve channel-tracking capability based on simplification of the ideal or optimal detector are now presented.

The present invention uses a COFDM system with convolutional coding (CC). Moreover, the present invention uses two iterative processing techniques using current and future tentative data decisions in the backward direction for channel estimation and the final decoding. This permits joint channel estimation and data decoding with improved channel-tracking capability, resulting in reliable link performance even under high user mobility and/or high RF carrier frequency. System level performance such as retransmission probability and packet delay in a system with aggressive frequency reuse using dynamic packet assignment (DPA) is also presented.

Since the wireless channel is correlated in time, the optimal joint detection requires processing the received signals and the decoded data in the past, current and future epochs. From (10) and (11), it can be seen that the joint detector in the related is sub-optimal because it attempts to predict the channel response at a time instant by only using received signals and decoded information in the past. In order to improve channel estimation by applying the current information, e.g., decoded data and newly received signal, an iterative solution can be applied.

At each time epoch n, after performing (9), (10) and (11), the present invention does not proceed to the time epoch n+1 immediately. Instead, the present invention uses the newly generated $\tilde{H}_{m,n+1}$, which is derived based on the current information, to substitute for the current channel estimate $\hat{H}_{m,n}$ and the computations in (9), (10) and (11) are repeated. In other words, the same procedures are performed twice. This additional iteration allows channel estimation to be performed based on the current information.

Figure 5:
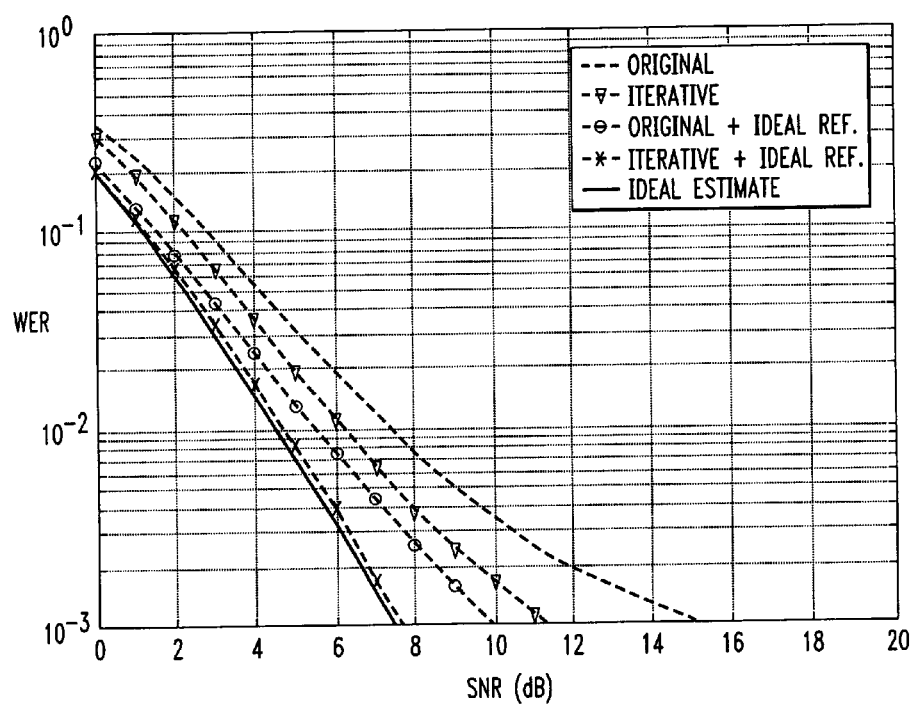
FIG. 5 depicts the performance of the iterative approach at 200 Hz maximum Doppler frequencies, where K=9.

In FIG. 5, the improvement of the system performance is shown. At each time instant n, if the perfect past channel were known, i.e., $[\tilde{H}_{m,1}, , , \tilde{H}_{m,n-1}]=[\tilde{H}_{m,1}, , , \tilde{H}_{m,n-1}]$ in (11), the new iterative processing can perform within 0.3 dB from the case in which channel is known. On the other hand, even if the perfect past channel information were available, the system performance would still be far from the optimal one with an irreducible error floor in the related sub-optimal solution. The SNR requirement of the new iterative approach at a WER of $10^{-2}$ is 1.2 dB lower than that of the original one. System performance for the original signal is indicated by a dashed line. Using an iterative approach is indicated by a dashed line with triangles. Using the original approach and having perfect past channel information is indicated by a dashed line with circles. Using an iterative approach and having perfect past channel information is indicated by a dashed line with cross lines. The ideal estimate is indicated by a solid line.

More than two iterations were attempted but the improvement was limited. Therefore, it was determined that another possible improvement probably should come from utilizing future information as described next.

Following the insights of the optimal approach, by taking into account both the current and the future information another step is performed. To take advantage of the future information in the channel estimation process, the FIR filter shown in (11) can be processed in the time-reversed fashion, i.e., $$\sum_{l=1}^{M_L} B_l d(\tilde{H}_{m,n+l-1}) - d(\hat{H}_{m,n-1}) = 0. \quad (13)$$

Hence, the iterative approach is performed backwards. Here, assume that the iterative approach mentioned in the last sub-section has been already carried out from time instant 1 to N. Therefore, $x_m$ and $\hat{c}$ are available with which to perform the iterative approach backward at a later time for tentatively detected previous signals; this method is thus referred to as iterative backward-processing approach. In order to process backward, $\tilde{H}_{m,n}$ is stored when the decoding result is correct (assuming an error detection mechanism is available) and $\hat{c}$ and $x_m$ when a decoding error occurs at a time instant n.

In general, there are three choices to perform the backward processing. The first choice is to process backward after all N OFDM-block data are processed. In reality, it is not a good choice because the channel memory length $K_m$ is not infinite and the delay of this approach may not be acceptable if N is large. A feasible approach is to process backward after having $M_l$ (FIR tap length) consecutive correct code words (OFDM blocks). This ensures that the backward processing will start from a reliable channel estimate. The last choice is to process backward starting at any other points, which is determined by memory and delay requirements. Performance degradation is expected. However, if the backward processing is started from a known training OFDM block, lower degradation can be achieved. With the last two choices, it is only necessary to store $M_N$ (<<N in general) OFDM-block data in the memory.

The iterative processing and iterative backward processing approaches share the similar baseband processing block diagram (FIG. 1A) with the related/original approach. The only difference is that the feedback is $\tilde{H}_{1,n-M+1}$, $\tilde{H}_{2,n-M+1}, \ldots, \tilde{H}_{1,n}, \tilde{H}_{2,n} \ldots$ and $\tilde{H}_{1,n-M_l}, \tilde{H}_{2,n-M_l}, \ldots, \tilde{H}_{1,n+1}, \tilde{H}_{2,n+1} \ldots$, respectively, when performing iterative processing and iterative backward processing. Their corresponding flowcharts are shown in FIG. 6A and FIG. 6B.

Figure 6A:
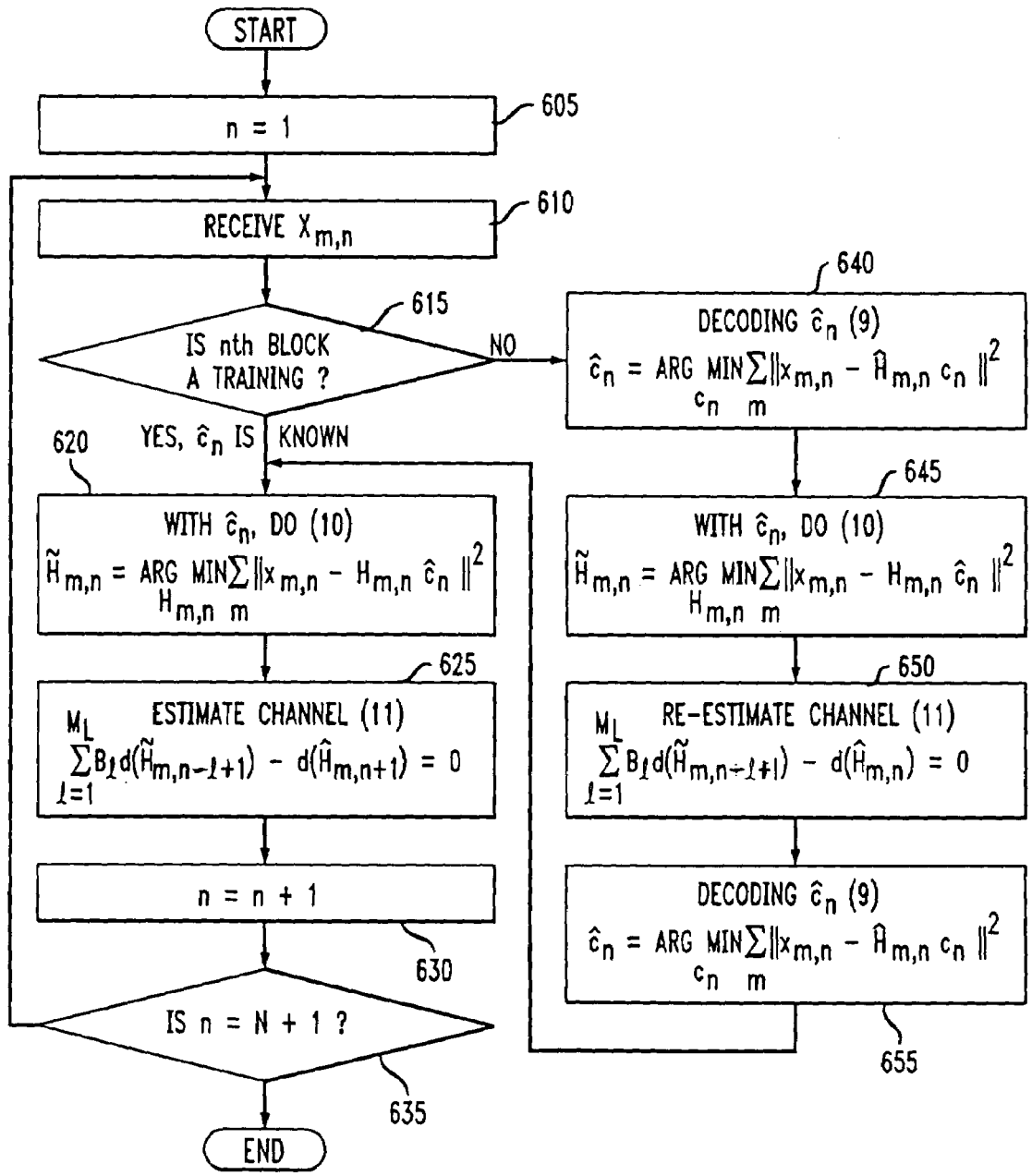
FIG. 6A is a flowchart for the iterative processing.
Figure 6B:
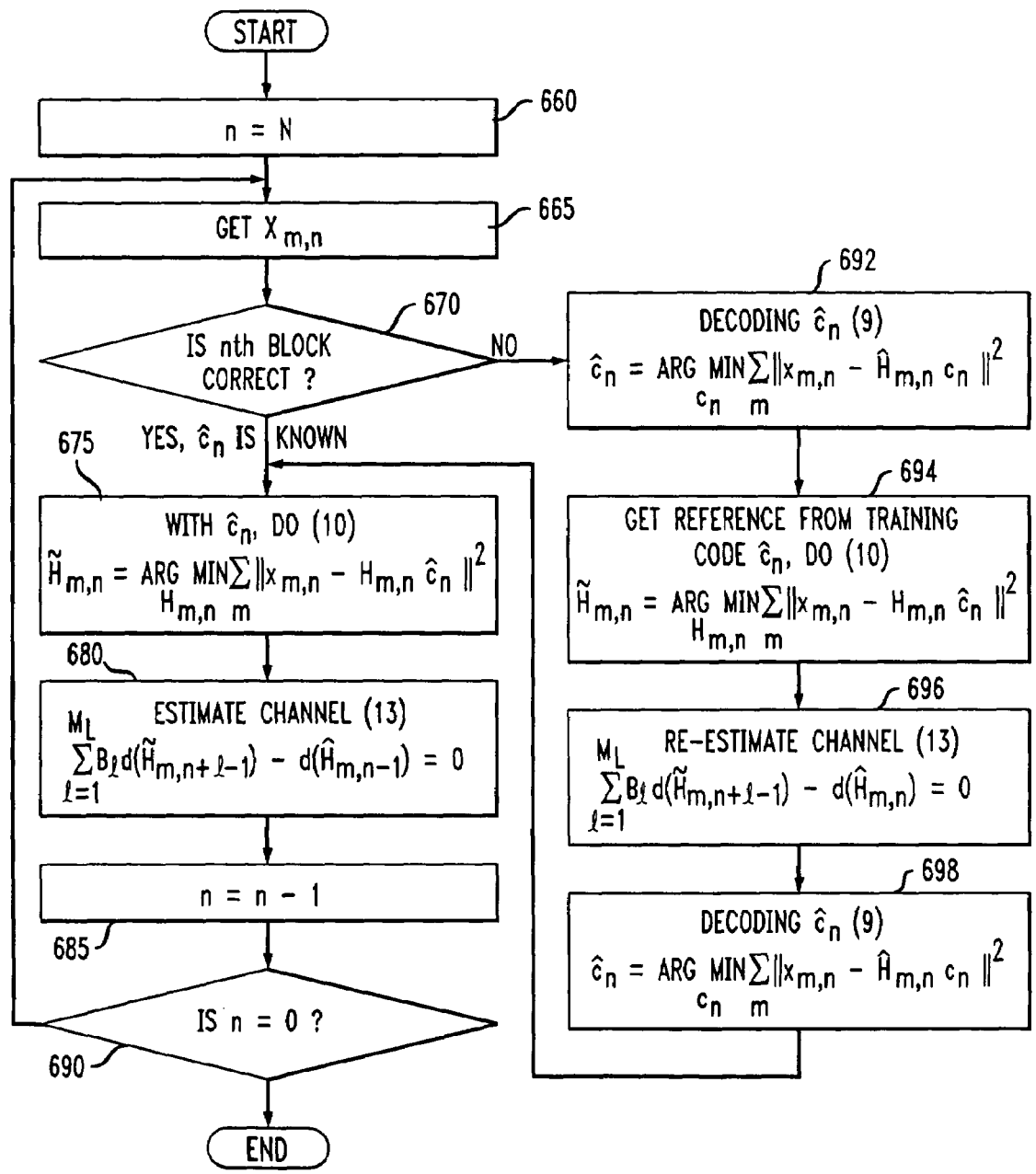
FIG. 6B is a flowchart for the iterative backward processing.

The iterative channel estimation method depicted in FIG. 6A is first initialized at step 605. The iterative processing for estimating channel characteristics is performed by using the system depicted in FIGS. 1A and 1B and as described above. Transmitted signals are received at step 610. A determination is then made as to whether the received block is a training block at step 615. If the received block is a training block then $\hat{c}_n$ is known and $$\tilde{H}_{m,n} = \underset{H_{m,n}}{\arg\min} \sum_m \|x_{m,n} - H_{m,n}\hat{c}_n\|^2$$

is calculated, which is a tentative reference signal, by first tentatively decoding the block of the received multicarrier signal at step 620. The tentative reference signal is then used to generate a tentative estimation for the channel at step 625 given by the equation $$\sum_{l=1}^{M_L} B_l d(\tilde{H}_{m,n+1-l}) - d(\hat{H}_{m,n+1}) = 0$$

which is calculated next. The tentative reference signal is then used to generate a tentative estimation for the channel at step 625, the block number is incremented at step 630, and a determination is made if the end of the frame has been reached at step 635. If the end of the frame has not been reached then another block of the received multicarrier signal is accepted for processing at step 610. If the current block is not a training block then $$\hat{c}_n = \underset{c_n}{\arg\min} \sum_m \|x_{m,n} - \hat{H}_{m,n} c_n\|^2$$

is calculated, which is a reference signal, by first decoding the block of the received multicarrier signal at step 640, the matrix $$\tilde{H}_{m,n} = \underset{H_{m,n}}{\arg\min} \sum_m \|x_{m,n} - H_{m,n}\hat{c}_n\|^2$$

is calculated at step 645, and it is then used to generate an estimation of channel characteristics given by $$\sum_{l=1}^{M_L} B_l d(\tilde{H}_{m,n+1-l}) - d(\hat{H}_{m,n+1}) = 0$$

at step 650. The block of the received multicarrier signal is then re-decoded using the estimation of the channel characteristics at step 655. The method then proceeds to step 620. This effectively repeats the reference and channel estimation. The reference and channel estimation are repeated in order to improve the calculations with the tentative reference and channel estimation calculations.

The iterative backward channel estimation method depicted in FIG. 6B is first initialized at step 660. The iterative backward processing for estimating channel characteristics is performed by using the system depicted by FIGS. 1A and 1B and as described above. Transmitted signals are received at step 665. A determination is then made as to whether the received block is correct at step 670. If the received block is correct then $\hat{c}_n$ is known and $$\tilde{H}_{m,n} = \underset{H_{m,n}}{\operatorname{argmin}} \sum_m \|x_{m,n} - H_{m,n}\hat{c}_n\|^2$$

is calculated, which is a tentative reference signal, by first tentatively decoding the block of the received multicarrier signal at step 675. This tentative reference signal is then used to generate a tentative estimation for the channel at step 680 given by $$\sum_{l=1}^{M_L} B_l d(\tilde{H}_{m,n+l-1}) - d(\hat{H}_{m,n-1}) = 0.$$

The block number is decremented at step 685 and a determination is made if the beginning of the frame has been reached at step 690. If the beginning of the frame has not been reached then another block of the received multicarrier signal is accepted for processing at step 665. If the current block is not correct block then $\hat{c}_n$ $$\hat{c}_n = \underset{c_n}{\operatorname{arg min}} \sum_m \|x_{m,n} - \hat{H}_{m,n}c_n\|^2$$

is calculated, which is a reference signal, by first decoding the block of the received multicarrier signal at step 692. This reference given by $$\tilde{H}_{m,n} = \underset{H_{m,n}}{\operatorname{arg min}} \sum_m \|x_{m,n} - H_{m,n}\hat{c}_n\|^2$$

is calculated followed by calculating at step 694 is then used to generate an estimation of channel characteristics at step 696 given by $$\sum_{l=1}^{M_L} B_l d(\tilde{H}_{m,n+l-1}) - d(\hat{H}_{m,n-1}) = 0.$$

The block of the received multicarrier signal is then re-decoded using the estimation of the channel characteristics at step 698, and control is returned to step 675. This effectively repeats the reference and channel estimation. The reference and channel estimation are repeated in order to improve the calculations with the tentative reference and channel estimation calculations.

Figure 7:
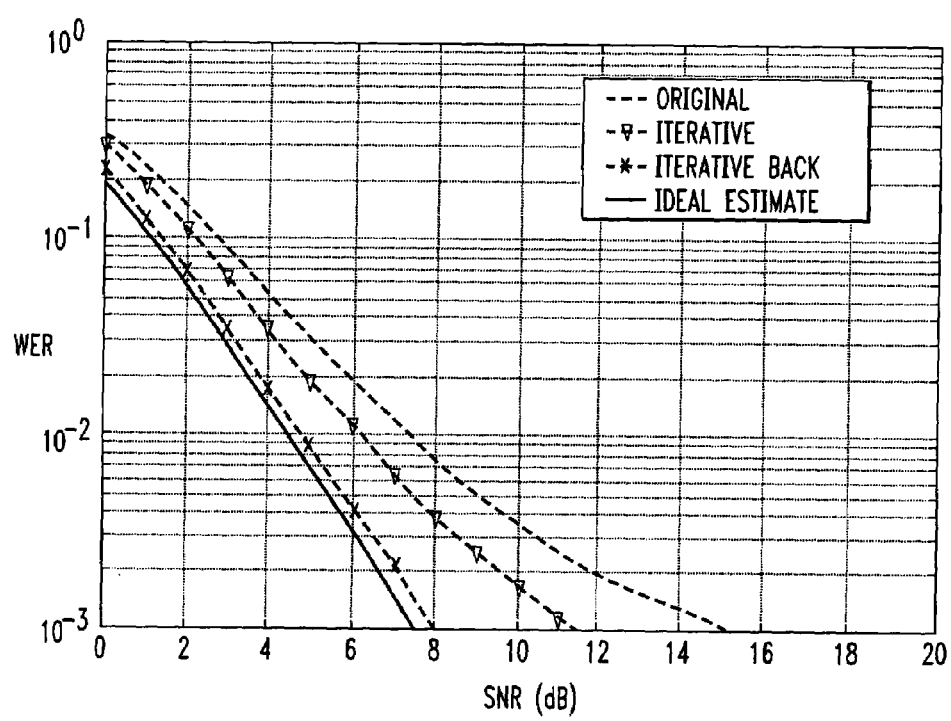
FIG. 7 shows the performance of iterative backward-processing approach at 200 Hz maximum Doppler frequency, where K=9.

In FIG. 7, the performance of this approach (iterative backward processing) is shown for 200 Hz maximum Doppler frequency. In the simulation, the maximum $M_N$ is set to be 200 and this corresponds to 40 ms. However, due to the low error probability in the high SNR region, much shorter storage is required. For instance, the maximum $M_N$ required is about 50 at the 5 dB SNR. It is found that nearly optimal performance is achieved with iterative backward processing. System performance using the original approach is indicated by a dashed line. System performance using the iterative approach is indicated by a dashed line with triangles. System performance using the iterative backward processing approach of FIG. 6B is indicated by a dashed line with cross lines. The ideal estimate is indicated by a solid line.

Figure 8:
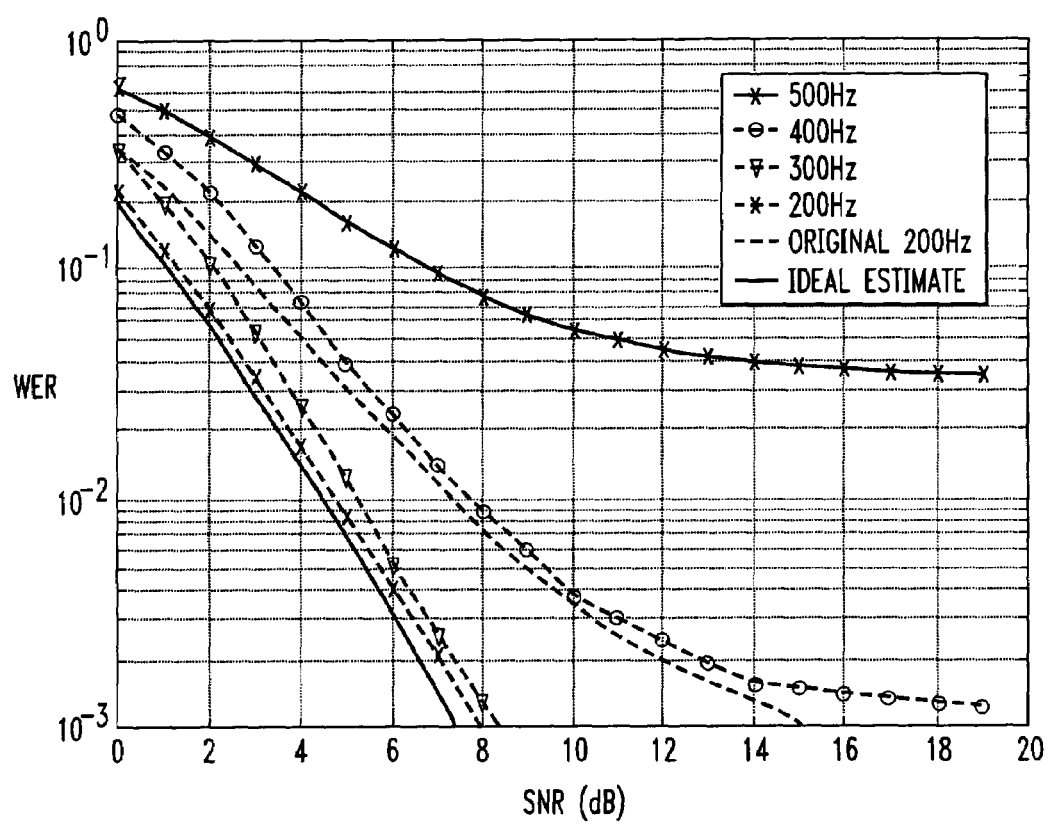
FIG. 8 shows the performance of iterative backward-processing approach at different maximum Doppler frequencies, where K=9.

In FIG. 8, the performance of this approach with different maximum Doppler frequencies is shown. The system still performs well in an environment with maximum Doppler frequency as high as 400 Hz. Once again the ideal estimate is indicated by a solid line. System performance at 500 Hz using iterative backward processing is indicated by a dashed line with crosses (or "x"s). System performance at 400 Hz using iterative backward processing is indicated by a dashed line with small circles. System performance at 300 Hz using iterative backward processing is indicated by a dashed line with triangles. System performance at 200 Hz using iterative backward processing is indicated by a dashed line with cross lines. System performance of the original approach at 200 Hz is indicated by a dashed line.

By applying the simple iterative estimation, the impact of noise is reduced by an additional round of filtering with newly available information. However, it may not eliminate the impact of decoding errors. Using iterative backward-processing, there is a chance to re-estimate the channel with fewer decoding errors and hence, better performance is achieved.

It should be noted that the Finite Impulse Response (FIR) estimator coefficients $B_l$ in the related sub-optimal method were optimized for the scenario without any iterative process. It should be noted, however, the detector architecture introduced here can be combined with any filter design for better tracking.

Figure 9:
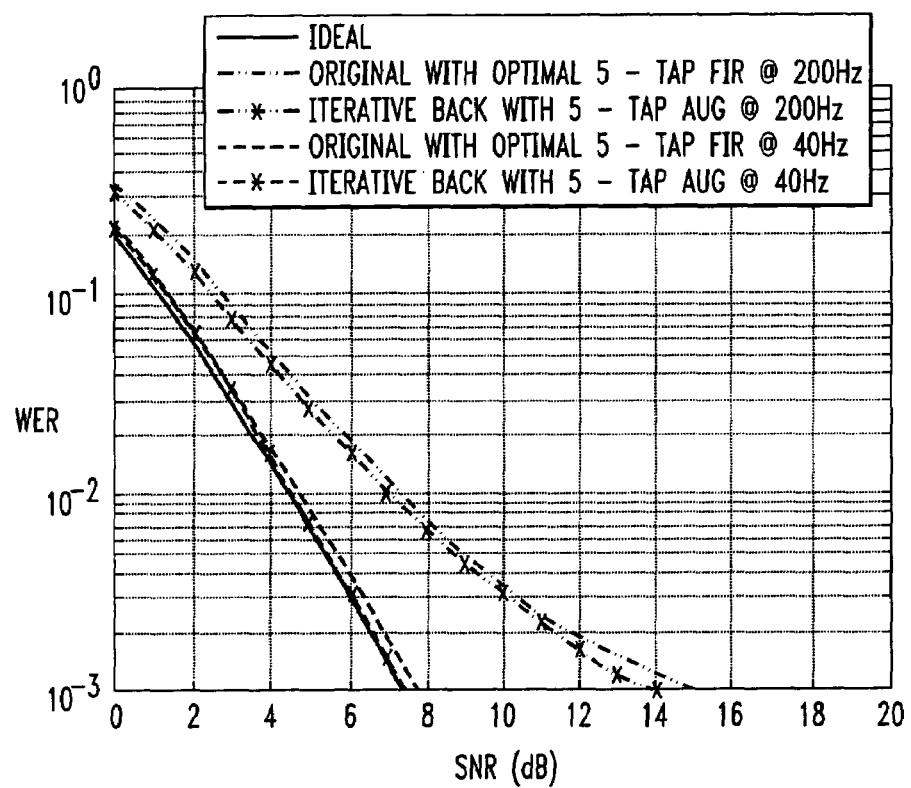
FIG. 9 is a comparison of systems having different time-domain FIR estimators, where K=9.

To show the robustness of the iterative approaches, a simple averaging 5-tap FIR filter ($b_l$=0.2) for the time domain filtering is now considered. As shown in FIG. 9, even with these simple FIR coefficients, the method of the present invention still outperforms the original method with the FIR that was optimized for a particular set of maximum Doppler frequency and delay spread. Therefore, the iterative backward-processing approach of the present invention is relatively robust against the mismatch between the FIR coefficients and the true channel. The ideal estimate is indicated by a solid line. System performance using the original approach and an optimal 5-tap FIR at 200 Hz is indicate by a dashed and dotted line. System performance using the original approach and an optimal; 5-tap FIR at 40 Hz is indicated by a dashed line. System performance using iterative backward processing and an optimal 5-tap FIR at 200 Hz is indicated by a dashed line with crosses (or "x"s). System performance using iterative backward processing and an optimal 5-tap FIR at 40 Hz is indicated by a solid line with crosses (or "x"'s).

Consider a MAC layer configuration to characterize the system-level performance under frequency reuse using the improved detection methods. A simulation system of 36 base stations arranged in a hexagonal pattern is used, each having 3 sectors, with a 20-dB front-to-back ratio and idealized antenna pattern. The same channel can be used everywhere, even in different sectors of the same base station, as long as the Symbol to Interference Ratio (SIR) in the DPA admission process exceeds 7 dB. The simulation of the simultaneous use of the same spectrum by users in different cells results in interference between cells. Interference is treated as if it behaves like noise.

A channel is defined to be a combination of time slot and RF carrier, each consisting of 120 subchannels described previously. By way of example, the results for the case with 3 RF carriers and 8 time slots are now presented. This occupies a total spectrum of less than 2.5 MHz, including guard bands and other overhead. Each time slot consists of 10 OFDM blocks, i.e., 2 msec. One of these OFDM blocks is used for training, as discussed previously, while an additional block can be allocated for guard time between time slots. In addition, assume that a control slot of duration 4 msec is inserted in the beginning of every frame of 8 traffic slots to enable paging, assignment and pilot transmission that are required for the DPA process. With this conservative assumption of overhead in time and frequency domains, 48 kb/s (8 OFDM blocks or 960 data bits transmitted in 20 msec) can be delivered using each time slots. Once paged, a mobile station (MS) measures the pilot signals to determine the desired traffic slots and reports the list back to the base station (BS). The BS then assigns traffic channel(s) and informs the MS this assignment for traffic packet delivery.

Based on the downlink frame structure, four adjacent BS's form a reuse group and they take turns performing the DPA procedure once every 4 frames. The time-reuse groups in the entire service area are pre-planned in a fixed and repeated pattern.

For the propagation model, the average received power decreases with distance d as $d^{-4}$ and the large-scale shadow-fading distribution is log-normal with a standard deviation of 10 dB. A data-service traffic model, based on wide-area network traffic statistics, which exhibit a "self-similar" property when aggregating multiple sources, was used to generate packets.

Automatic Retransmission reQuest (ARQ) is employed for retransmission when a packet is received in error. A packet in this case is theoretically 8 code words in each time slot, but the error probability is represented by using the WER curves. Since the error probability of the 8 code words in a time slot is highly correlated and additional coding is usually included for the entire packet, this approximation provides reasonable performance estimation for the MAC layer. If a packet cannot be successfully delivered in 3 seconds, which may be a result of traffic overload or excessive interference, it is dropped from the queue. The control messages are assumed to be error-free in the designated control slots.

Figure 2:
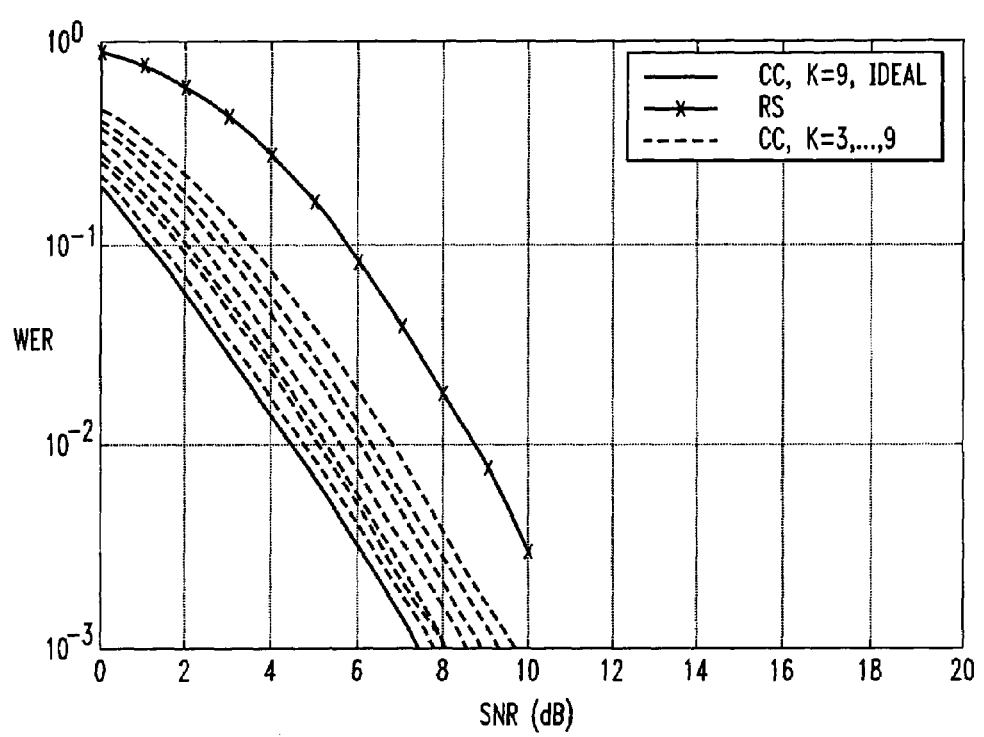
FIG. 2 is a comparison of RS and convolutional codes, where the maximum Doppler frequency is 40 Hz.
Figure 3:
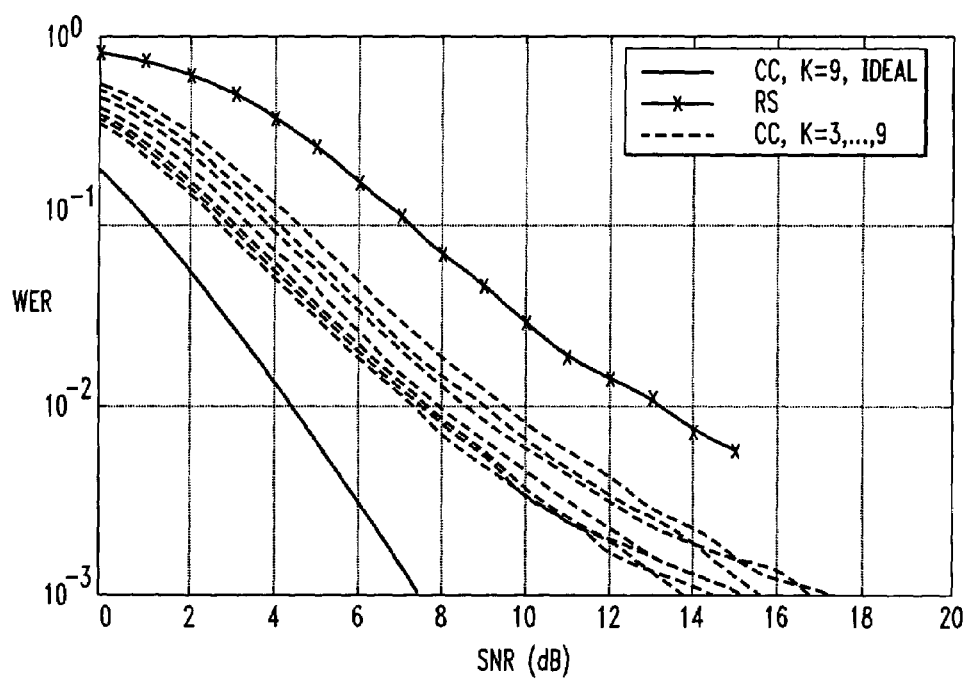
FIG. 3 is a comparison of RS and convolutional codes, where the maximum Doppler frequency is 200 Hz.
Figure 4:
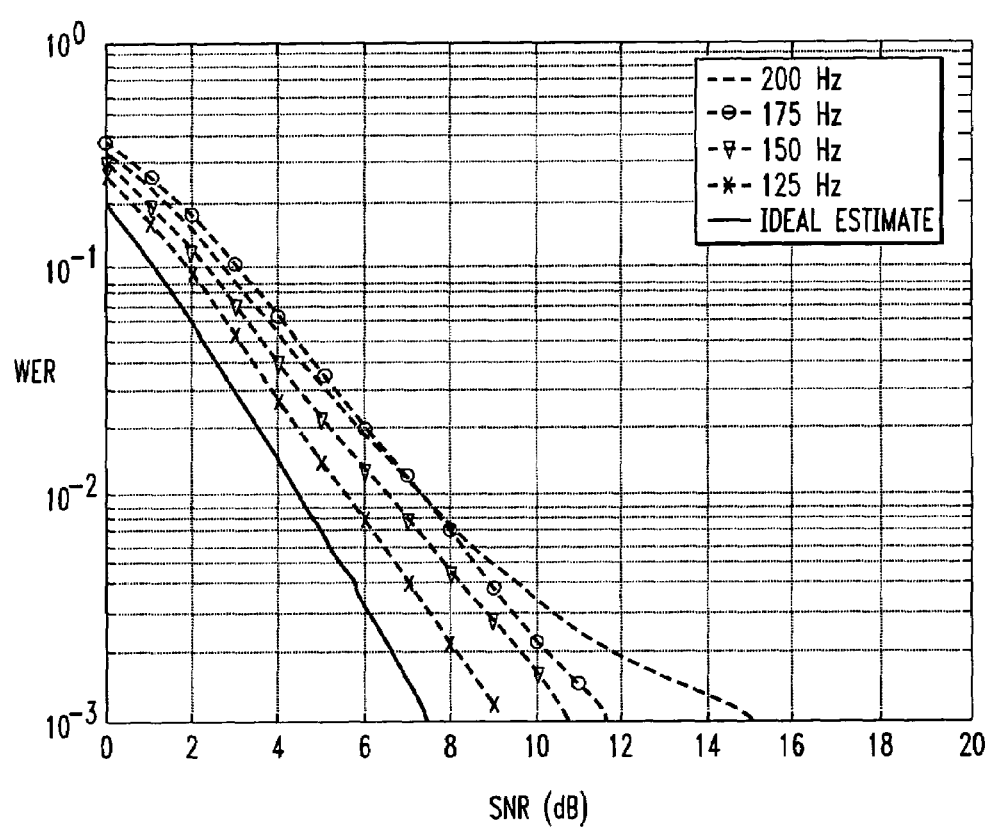
FIG. 4 depicts the performance of the K=9 CC at different maximum Doppler frequencies.
Figure 10:
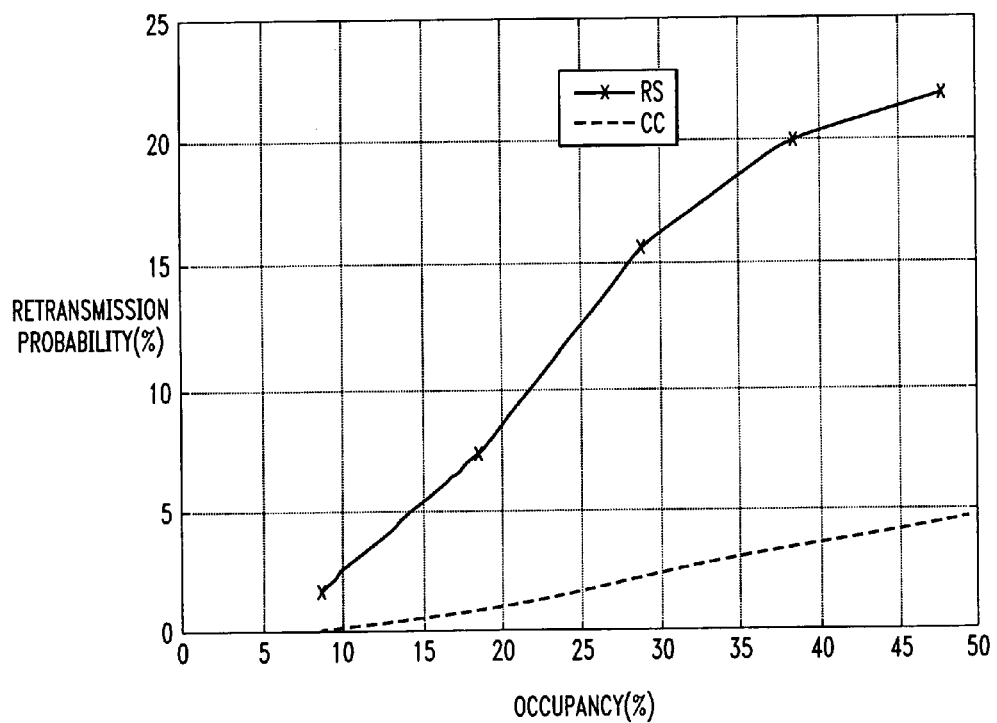
FIG. 10 shows the average retransmission probability as a function of occupancy per sector. Eight slots and three RF carriers (<2.5 MHz) are reused in every base station, each with three sectors, using Dynamic Packet Assignment (DPA). In the original (non-iterative) method, K=5, 40 Hz Doppler or K=9, 125 Hz Doppler.

First consider K=5 and 40 Hz or K=9 and 125 Hz based on the related/original (non-iterative) method, both give similar link performance (see FIGS. 2 and 5), for a comparison between RS and CC coding methods. FIG. 10 shows the average probability of packet retransmission, as a function of occupancy for all available (24) channels in each sector. This is a measure of QoS (quality of service) experienced by individual users. With a 3–6% target retransmission probability, 15–50% occupancy per radio in each sector is possible with this DPA scheme, depending on the use of coding schemes. Clearly, joint channel estimation and maximum likelihood detection of CC indicated by a dashed line introduced previously provides significant improvement over the case of RS codes, indicated by a solid line with cross lines which is also similar to the case of differential demodulation of the RS codes with 4 transmit antennas. Both results are significantly superior to the efficiency provided by current cellular systems, which are typically designed for voice communications with very conservative frequency reuse, about 4–7% spectrum occupancy in each sector. Data applications, permitting some retransmission delay, and improved link design, introduced here, allow much more aggressive and efficiency frequency reuse.

Figure 11:
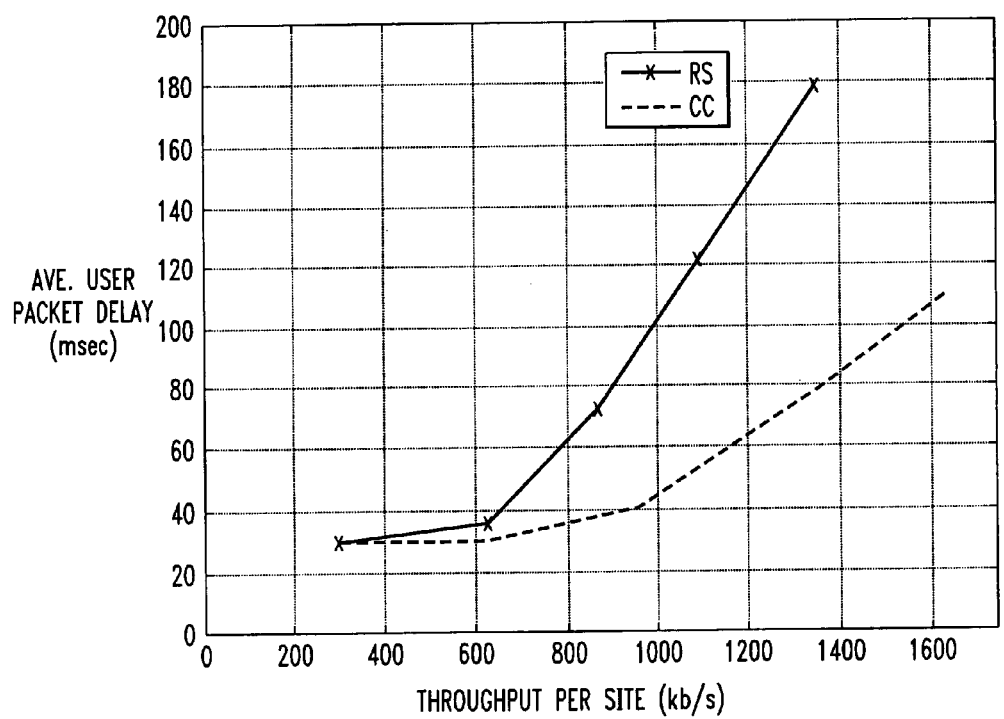
FIG. 11 shows the average delay of delivered packets as a function of throughput per base station, each with three sectors. Eight slots and three RF carriers (<2.5 MHz) are reused in everywhere using DPA. In the original (non-iterative) method, K=5, 40 Hz Doppler or K=9, 125 Hz Doppler.

FIG. 11 shows that 1–1.5 Mb/s can be successfully delivered by each base station with an average delay on the order of 40–120 msec. This is a measure for system capacity. It indicates that OFDM link and DPA MAC combined enable a spectrally efficient (40%–60% b/s/Hz with a conservative assumption of overhead requirements) air interface for broadband services, even for the macrocellular environment considered here. Adaptive modulation has not been considered in this study, and its use is expected to improve efficiency beyond 1 b/s/Hz per base station even under aggressive frequency reuse. The OFDM technology discussed herein can provide robust performance with peak-rates scalable with the available bandwidth. RS codes are indicated by a solid line with cross lines. CC codes are indicated by a dashed line.

Figure 12:
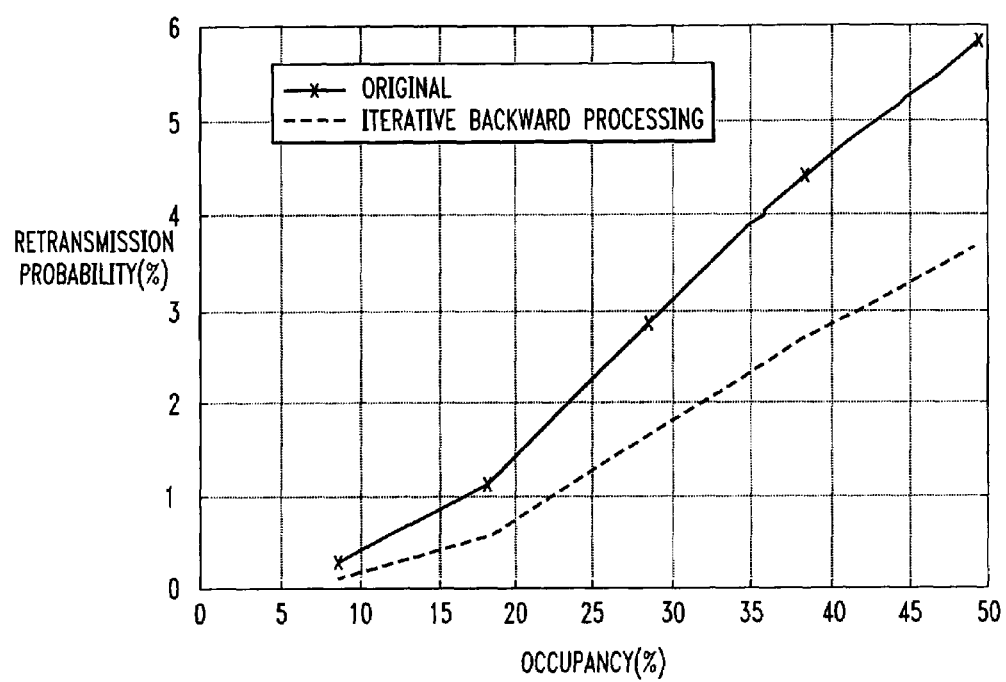
FIG. 12 depicts the average retransmission probability as a function of occupancy per sector. Eight slots and three RF carriers (<2.5 MHz) are reused in every base station, each with three sectors, using DPA, where K=9, 200 Hz Doppler.
Figure 13:
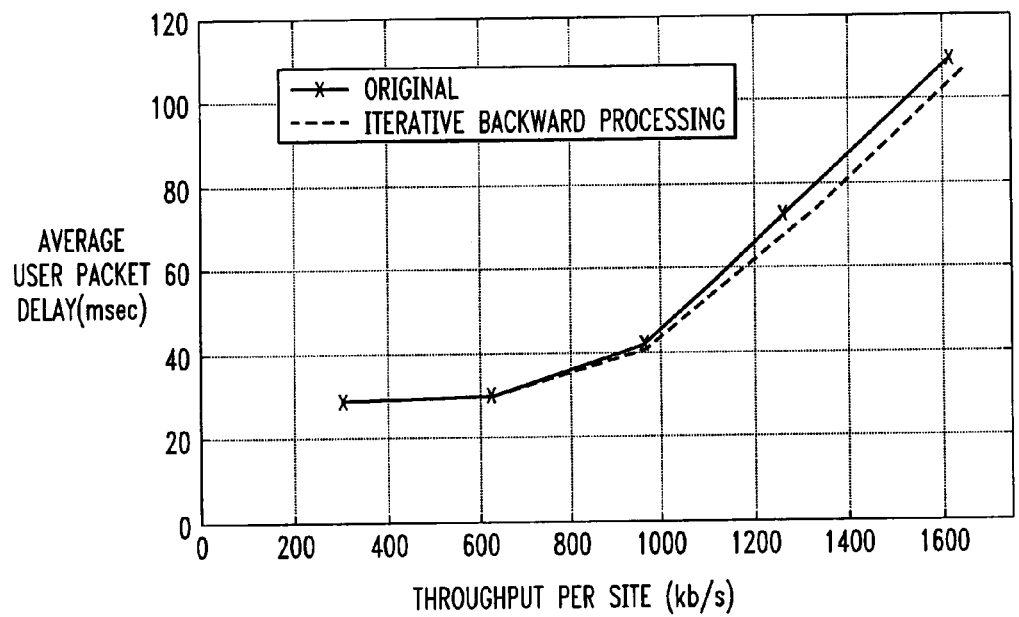
FIG. 13 shows the average delay of delivered packets as a function of throughput per base station, each with three sectors. Eight slots and three RF carriers (<2.5 MHz) are reused in everywhere using DPA, where K=9, 200 Hz Doppler.

Next, consider the case of high maximum Doppler frequency (200 kHz) and K=9 (WER curves in FIG. 6) for comparison between sub-optimal ("original") detection method discussed earlier and near-optimal iterative backward-processing method presented. FIG. 12 shows that retransmission probability using the improved method can work well even under high maximum Doppler frequency. As a result, QoS can be improved even for high mobility users or when higher carrier frequency is employed. System performance using the original detection method is indicated by a solid line with cross lines. System performance using the iterative backward processing approach is indicated by a dashed line. On the other hand, the capacity difference is relatively smaller, as shown by the delay-throughput curves in FIG. 13. System performance using the original approach is indicated by a solid line with cross lines and system performance using the iterative backward processing is indicated by a dashed line This is because both methods give very good radio link performance and the delay is dominated by sharing limited number of traffic slots, which is independent of the WER performance. In this case, better traffic resource management, such as improved admission control, could achieve capacity improvement. If higher Doppler frequency, e.g., 400 Hz, were encountered, the improved link performance introduced by the iterative backward-processing method, as shown in FIG. 8, would also result in system capacity enhancement.

Returning to FIG. 1A to show the detail of the decoder (DEC) unit and its relation with the Channel Estimator (CE) unit, with channel estimates $\hat{H}_{m,n}$, $\hat{c}_n$ can be calculated by maximum likelihood (ML) decoding (9), $$\hat{c}_n = \underset{c_n}{\arg\min} \sum_m \left\| x_{m,n} - \hat{H}_{m,n} c_n \right\|^2.$$

Figure 1A:
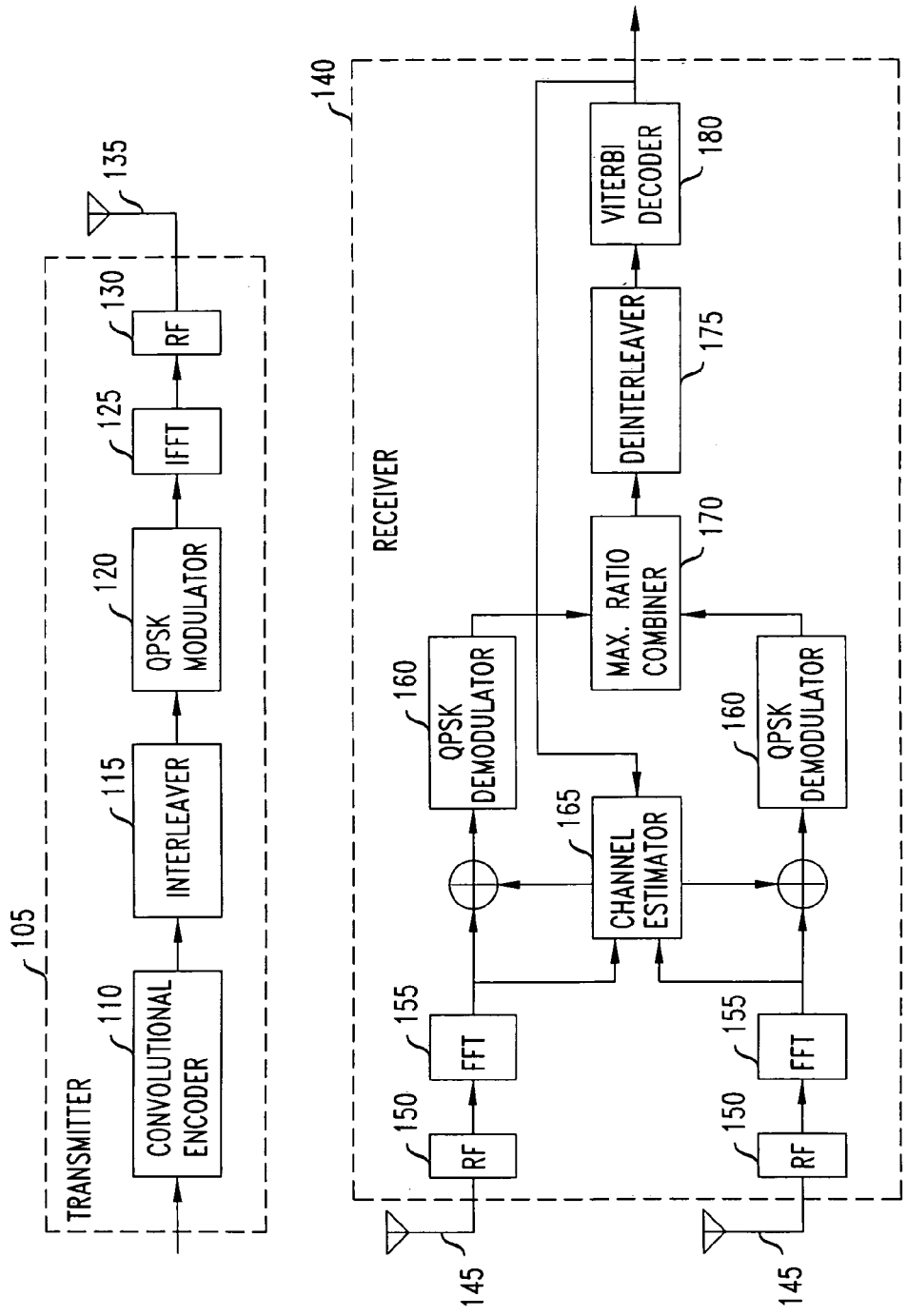
FIG. 1A is the physical configuration of a system for transmitting and receiving signals.
Figure 1B:
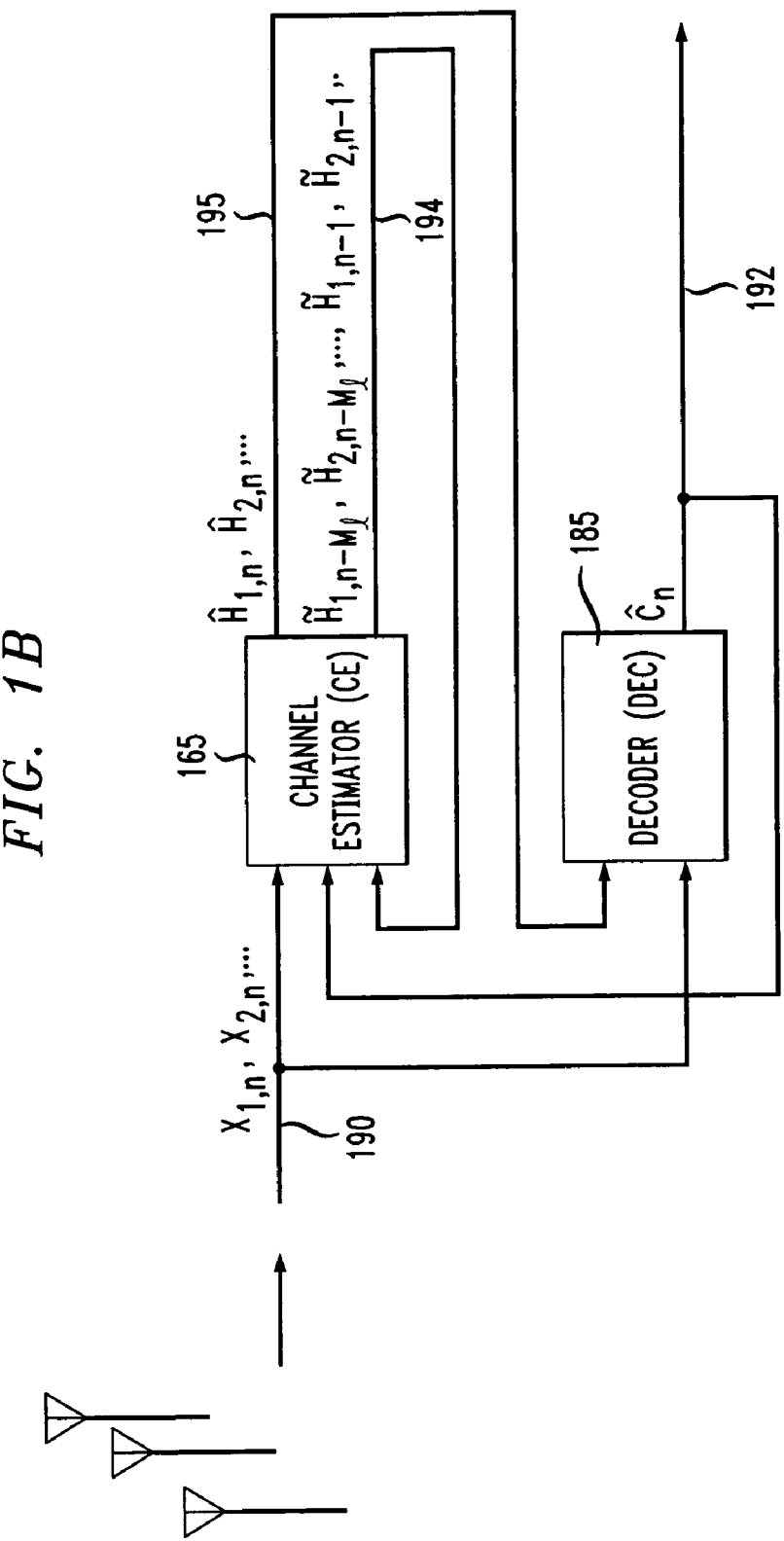
FIG. 1B is a block diagram for a baseband receiver at time instant n.
Figure 1C:
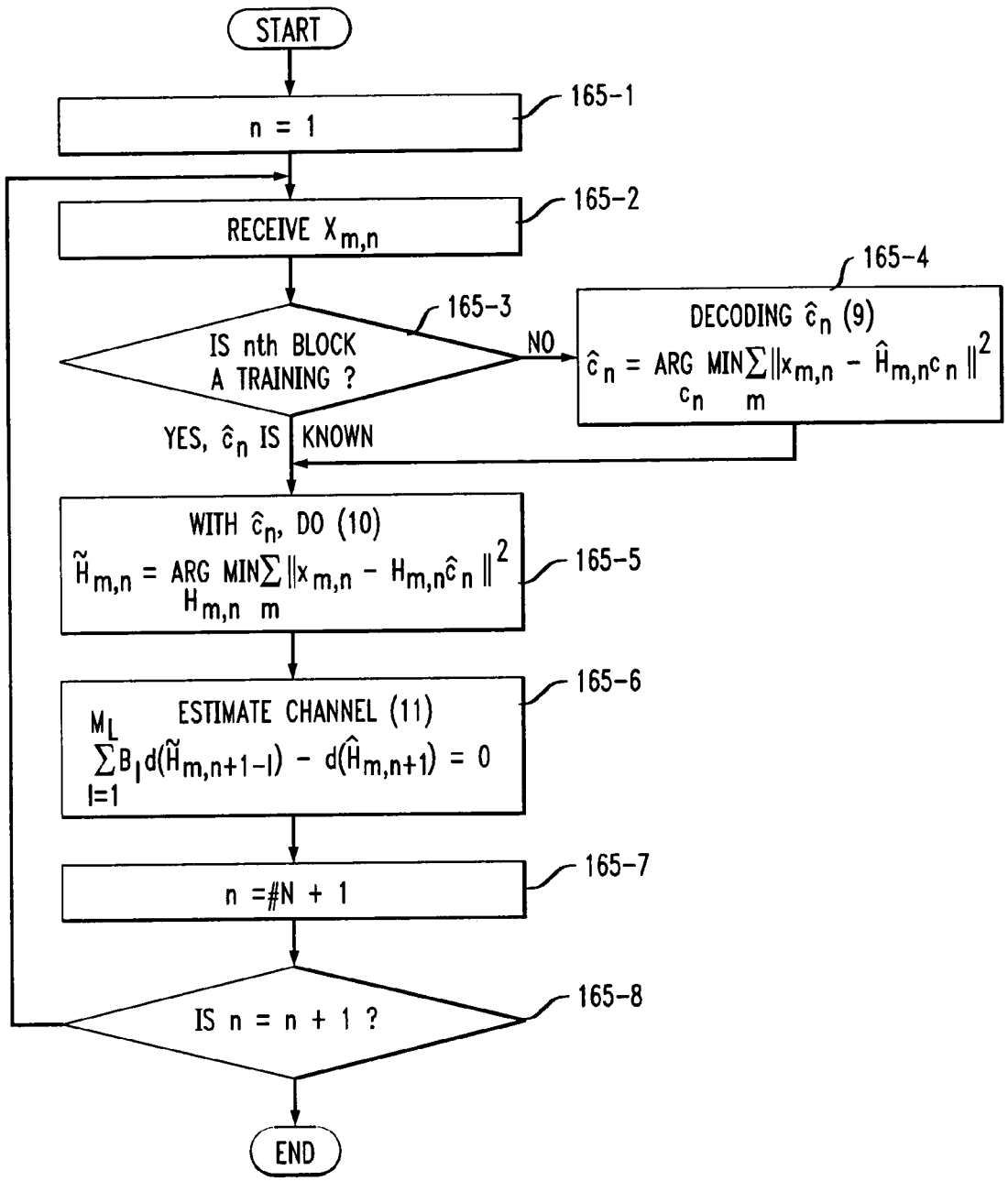
FIG. 1C is a flowchart for a related sub-optimal channel estimation method.

In FIG. 1A, this decoding process is divided into 4 parts, e.g. QPSK Demodulator, a maximum ratio combiner (MRC), Deinterleaver and Viterbi decoder. How to separate these 4 units is now explained.

We have $$\sum_m \|x_{m,n} - \hat{H}_{m,n} c_n\|^2 = \sum_k \left( \sum_m \|x_{m,n,k} - h_{m,n,k} c_{n,k}\|^2 \right)$$
$$= \sum_k \left( \sum_m \|x_{m,n,k}\|^2 - 2\mathrm{Re}\{x^*_{m,n,k} h_{m,n,k} c_{n,k}\} + \|h_{m,n,k} c_{n,k}\|^2 \right)$$

Note that $$\sum_k \sum_m \|x_{m,n,k}\|^2$$

makes no contribution to our minimization and due to binary convolutional code with QPSK modulation, $\|c_{n,k}\|^2$ is a constant.

$$\sum_k \left( \sum_m \|h_{m,n,k}\|^2 \|c_{n,k}\|^2 \right)$$

makes no contribution to our minimization either. So we concentrate on $$\sum_k \left( \sum_m \mathrm{Re}\{x^*_{m,n,k} h_{m,n,k} c_{n,k}\} \right) = \sum_k \mathrm{Re}\left\{ \left( \sum_m x^*_{m,n,k} h_{m,n,k} \right) c_{n,k} \right\}$$
$$= \sum_k \left( \left[ \sum_m \mathrm{Re}\{x^*_{m,n,k} h_{m,n,k}\} \right] \mathrm{Re}\{c_{n,k}\} - \left[ \sum_m \mathrm{Im}\{x^*_{m,n,k} h_{m,n,k}\} \right] \mathrm{Im}\{c_{n,k}\} \right)$$

The demodulator and the MRC calculate $$\sum_m \mathrm{Re}\{x^*_{m,n,k} h_{m,n,k}\} \text{ and } \sum_m \mathrm{Im}\{x^*_{m,n,k} h_{m,n,k}\}.$$

And the remainder is done by the deinterleaver and the decoder.

Conceptually, the MRC does only energy combining. So, we perform the following calculations:

$$\sum_m \mathrm{Re}\{x^*_{m,n,k} h_{m,n,k}\} = \sum_m \mathrm{Re}\{x^*_{m,n,k} \arg(h_{m,n,k})\} \|h_{m,n,k}\|$$
$$\sum_m \mathrm{Im}\{x^*_{m,n,k} h_{m,n,k}\} = \sum_m \mathrm{Im}\{x^*_{m,n,k} \arg(h_{m,n,k})\} \|h_{m,n,k}\|.$$

Then, $\mathrm{Re}\{x_{m,n,k}^* \arg(h_{m,n,k})\}$ and $\mathrm{Im}\{x_{m,n,k}^* \arg(h_{m,n,k})\}$ are actually QPSK demodulation. And the remainder is the MRC.

The radio-link performance of our COFDM system with the novel and non-obvious combination of two channel estimation schemes under fast fading validate the design methodology and system for near optimal joint channel estimation and data detection.

For a COFDM system, coherent detection can significantly improve radio link performance, but it requires a channel estimator to achieve the potential gain. The present invention applies a forward channel estimation and maximum likelihood decoding method for a COFDM system with convolutional codes and a simple interleaving scheme. It is shown that the performance of such a system significantly outperforms the one with Reed-Solomon codes. The performance under different fading rates was studied to understand the performance limits and areas for improvement. Simulations showed that this detection method is able to achieve near optimal performance in a wireless environment with maximum Doppler frequency as high as 100 Hz. However, as fading rate increases further, irreducible error floor is introduced by the limitation in channel-tracking capability. A near-optimal detection method has been presented to improve the channel tracking performance, which is based on iterative processing and iterative backward processing of channel estimation and data decoding. Within practical values of interest, error floor can be eliminated even for very high fading rates, which is important for cases with high mobility or when higher carrier frequencies are considered in the future. Radio system performance based on the improved link techniques and a medium access control protocol using dynamic packet assignment was also studied. With radio link improvement, system throughput and delay can be significantly enhanced for better quality of service and spectrum efficiency. The system is also greatly simplified by allowing reuse factor of one without frequency planning.

It should be clear from the foregoing that the objectives of the invention have been met. While particular embodiments of the present invention have been described and illustrated, it should be noted that the invention is not limited thereto since modifications may be made by persons skilled in the art. The present application contemplates any and all modifications that fall within the spirit and scope of the underlying invention disclosed and claimed herein.

What we claim is:

1. A method for receiving and decoding signals in a multicarrier transmission system comprising the steps of:
    receiving, from each of a plurality of antennas, a multicarrier signal corresponding to a transmitted multicarrier signal;
    applying a Fast Fourier transformation to each of said received multicarrier signals to form respective transformed multicarrier signals;

estimating characteristics of a channel over which said transmitted multicarrier signal passed to said antennas using iterative forward processing; and decoding said transformed multicarrier signal, wherein said iterative forward processing includes the steps of:

accepting a transformed block of a frame from each of said transformed multicarrier signals, said transformed block having an associated block number that indicates ordinal position of said block in said frame;

determining whether said transformed blocks accepted from transformed multicarrier signals, corresponds to a transmitted training block;

if said accepted transformed blocks correspond to said transmitted training block,
  (a) calculating a tentative reference signal from said accepted transformed blocks;
  (b) generating a tentative estimation of channel characteristics using said tentative reference signal;
  (c) incrementing said block number;
  (d) returning to said step accepting if said block number indicates that an end of said frame has not been reached;

if said accepted transformed blocks do not correspond to said transmitted training block,
  (e) decoding said accepted transformed blocks;
  (f) re-calculating said tentative reference signal based on said accepted transformed blocks and results of said decoded transformed blocks;
  (g) re-generating said estimation of channel characteristics, using the tentative reference signal re-calculated in step (f);
  (h) re-decoding said accepted transformed blocks using the estimation of channel characteristics re-generated in step (g); and
  (i) returning to step (a).

2. The method according to claim 1, wherein said decoding step (e) and re-decoding step (h) are performed using $$\hat{c}_n = \underset{c_n}{\operatorname{argmin}} \sum_m \|x_{m,n} - \hat{H}_{m,n} c_n\|^2,$$

where $x_{m,n}$ is the transformed block, $\hat{H}_{m,n}$ is said estimation of channel characteristics, $c_n$ is a vector of known result values, and $\hat{c}_n$ is a vector of the decoded results.

3. A method for estimating channel characteristics in a multicarrier transmission system comprising the steps of:

receiving, from each of a plurality of receiving ports, a sequence of multicarrier signal blocks of a transmitted frame containing N blocks, where each received block has an associated block number, k, that designates an ordinal position of said block in said frame;

processing received blocks of said frame having block number N by:
  (a) setting value of k to N;
  (b) applying a Fast Fourier transformation to block k to form transformed blocks k; and
  (c) performing backward processing by:
    tentatively decoding said transformed blocks k;
    calculating a tentative reference signal based on previously processed blocks that correspond to a transmitted training block;
    generating a tentative estimation of channel characteristics using said tentative reference signal;
    re-decoding said transformed blocks k;
    calculating a reference signal based on said re-decoded transformed blocks k,
    generating an estimation of channel characteristics using said reference signal;
    decrementing value of the block number;
    determining whether the decremented value corresponds to the beginning of said frame; and
    returning to said step of performing backward processing when the decremented value does not correspond to the beginning of said frame.

4. The method according to claim 3, wherein Fast Fourier transformations are applied to each of said sequences received from the receiving ports.

5. The method according to claim 3, wherein said tentatively decoding and said re-decoding each employs a combined signal developed by:

demodulating said transformed blocks k to form demodulated signals;

combining said demodulated signals using a maximum ratio combiner to form said combined signal; and Viterbi decoding said combined signal.

6. The method according to claim 5, further comprising the step of deinterleaving said combined signal if said combined signal was interleaved for transmission.

7. The method according to claim 5, wherein said demodulating step is performed substantially concurrently on said transformed blocks k.

8. The method according to claim 5, wherein said demodulating step is performed using QPSK demodulating techniques.

* * * * *